United States Patent [19]

Bonis

[11] 4,402,889
[45] Sep. 6, 1983

[54] MAKING SHEET WITH MOISTURE BARRIER PROPERTIES COEXTRUDED FROM SCRAP MATERIALS

[75] Inventor: Laszlo J. Bonis, Swampscott, Mass.

[73] Assignee: Composite Container Corporation, Medford, Mass.

[21] Appl. No.: 345,932

[22] Filed: Feb. 4, 1982

[51] Int. Cl.³ .............................................. B29C 29/00
[52] U.S. Cl. ...................................... 264/37; 264/145; 264/171; 264/210.2; 264/DIG. 69; 425/131.1; 425/133.5; 425/DIG. 46
[58] Field of Search .............. 264/37, 145, 171, 210.2, 264/DIG. 69; 425/DIG. 46, 133.5, 131.1

[56] References Cited

U.S. PATENT DOCUMENTS

| | | | |
|---|---|---|---|
| 3,132,194 | 5/1964 | Edmonds et al. | 264/37 |
| 3,271,482 | 9/1966 | Harada et al. | 264/37 |
| 3,567,815 | 3/1971 | Frank | 264/37 |
| 3,723,582 | 3/1973 | Winstead | 264/37 |
| 3,883,624 | 5/1975 | McKenzie et al. | 264/37 |
| 3,954,923 | 5/1976 | Valyi | 264/37 |
| 3,993,810 | 11/1976 | Bonis | 264/171 |
| 4,101,050 | 7/1978 | Buckler et al. | 428/516 |
| 4,234,663 | 11/1980 | Catte et al. | 264/37 |
| 4,250,129 | 2/1981 | Winstead | 264/37 |
| 4,287,147 | 9/1981 | Hungerford | 425/133.5 |

FOREIGN PATENT DOCUMENTS 1552234  9/1979  United Kingdom ................ 264/37

Primary Examiner—Jeffery R. Thurlow

[57] ABSTRACT

Coextruding an inexpensive multilayered plastic sheet with outer layers of scrap material and a central layer of unqualified scrap having sufficient polyolefin content to provide a moisture barrier.

10 Claims, 4 Drawing Figures

MAKING SHEET WITH MOISTURE BARRIER PROPERTIES COEXTRUDED FROM SCRAP MATERIALS

FIELD OF THE INVENTION

The invention relates to coextruding multilayered plastic sheets.

BACKGROUND OF THE INVENTION

In the manufacture of plastic objects, large quantities of scrap material are generated during trimming and other operations, and a market has developed for the sale and purchase of the scrap materials.

The following definitions apply herein:

"scrap" or "scrap materials" means plastic materials including plastics which have been extruded or otherwise subjected to a process involving heating, whether the scrap or scrap material has been purchased in the market or is waste product from an in-house process, "qualified scrap" means either virgin plastic material (e.g., not extruded or otherwise processed before) or scrap material of one type of plastic only, and "unqualified scrap" means scrap materials which are unspecified, except that there should be less than 10% acrylic material, less than 15% thermodegradable material (i.e., material that breaks down when subjected to more than one thermal cycle, e.g., polyvinyl chloride or acrylonitriles), and the sum of acrylic material and thermodegradable material should be less than 15%.

SUMMARY OF THE INVENTION

I have discovered that a useful multilayered plastic sheet can be inexpensively manufactured by coextruding outer layers of qualified scrap material, and a central layer of unqualified scrap having high enough polyolefin content to provide a moisture barrier.

In some preferred embodiments there are intermediate tie layers between the central layer and the outer layers of adhesive that binds with the qualified scrap and the predominant plastic in the unqualified scrap; the qualified scrap is impact resistant polystyrene; the unqualified scrap includes polypropylene and polystyrene; the unqualified scrap has more than about 10% polyolefin; and the sheet has a moisture permeability at 78° F., 90% humidity of about 0.02 gm/100 in²-24 hr.

In other preferred embodiments the predominant plastic in the unqualified scrap is greater than 70% of the total weight, and the unqualified scrap is directly bonded to the outer layers of qualified scrap of the predominant plastic, thereby avoiding tie layers; and the predominant plastic in the unqualified scrap is polystyrene, and the outer layers are polystyrene.

So long as the conditions of acrylic content and thermodegradable plastic content are met, and appropriate tie layers for the qualified scrap and the major materials in the unqualified scrap are used, scrap materials obtained from different sources and having widely varying content of different plastics can be coextruded, thus greatly simlifying process controls and the cost of manufacture.

DESCRIPTION OF THE PREFERRED EMBODIMENT

The structure and manufacture of the presently preferred embodiment of the invention will now be described after first briefly describing the drawings.

DRAWINGS

STRUCTURE

Turning to the figures, there is shown container 10 for holding small plants for sale in nurseries.

Container 10 is thermoformed from a multilayered sheet formed by coextrusion.

Figure 1:
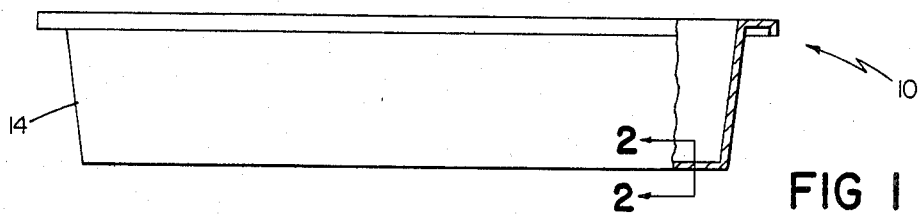
FIG. 1 is an elevation, partially broken away, of a container according to the invention.
Figure 2:
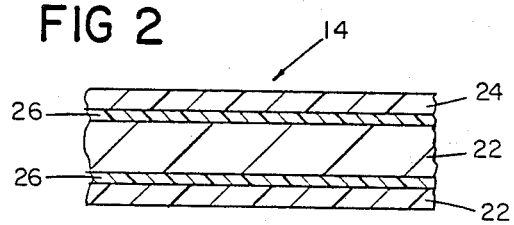
FIG. 2 is a cross-sectional view, taken at 2—2 of FIG. 1, showing the multilayer structure of the container.

Referring to FIG. 2 there is shown a portion of the wall 14 of container 10. It has thirty-three mil thick central layer 22 made of unqualified scrap, three mil thick outer layers 24 of qualified polystyrene scrap (virgin high impact polystyrene available from Plastics Distributors Company), and one-half mil thick intermediate tie layers 26 made of suitable adhesive (available from DuPont under the trade designation ELVAC 3190).

The unqualified scrap is 70% scrap trimmed from a five-layer coextruded sheet having one layer (68%) of polypropylene (available from Rexene Company, Paramus, N.J. and having an $H_2O$ permeability at 100° F., a 90% humidity of less than about 1.0 gm/mil/100 in²-24 hr and a melt flow index of 4 decigrams/min), two layers (30%) of impact resistant polystyrene (70% crystal styrene and 30% rubber modifying plastomer sold by Phillips Chemical Company under the trade designation Solprene 416P, a block polymer having a butadiene/styrene ratio of 70/30, a molecular weight of 140 M, a density of 0.94, and a melt flow index of 2 decigrams/min), and two adhesive layers (2%) of the rubber modifying plastomer; 10% scrap trimmed from a five-layer sheet of the same materials of the first five layer sheet but with two outer layers (40%) of polypropylene, an inner layer (58%) of impact resistant polystyrene, and two adhesive tie layers (2%), and 20% of reground scrap obtained during the manufacture of container 10. In thirty-three mil thick unqualified scrap layer 22, the overall polypropylene content is about 52%.

Container 10 has moisture permeability at 90% humdity and 78° F. of 0.02 gm/100 in²-24 hr, owing to the polypropylene in the unqualified scrap material. The symmetrical nature of the five-layer wall structure provides resistance to curling.

MANUFACTURE

Figure 3:
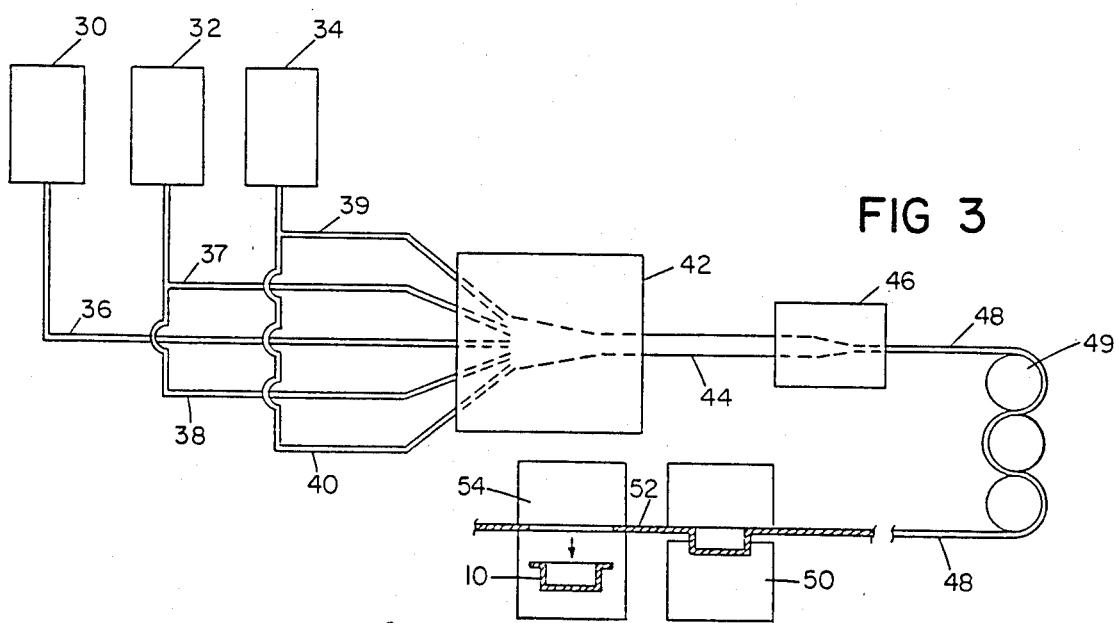
FIG. 3 is a diagrammatical view of the manufacturing process for forming the FIG. 1 container.

Referring to FIG. 3, the coextrusion process for forming the five-layer sheet for container 10 is shown. The unqualified scrap and qualified scrap are first separately pelletized prior to placing in heated containers 30, 34, respectively. Heated container 32 serves as a source of the adhesive tie layer material. Five conduits 36, 37, 38, 39, 40 supply the heated materials to coextrusion block 42. There the materials merge together to form under pressure a unitary, five-layer thick stream 44 of generally circular cross-section. The middle layer is made of the unqualified scrap, the outer layers are made of qualified scrap polystyrene, and the intermediate layers are made of the adhesive tie layer material. Stream 44 passes into extrusion die 46 (e.g., Welex standard 54" flex-lip) and is extruded into continuous sheet 48. Sheet 48 then passes through a series of chill rolls 49. The sheet may then be processed into containers, or wound into spools (not shown) for storage.

To process sheet 48 into containers, the sheet is passed through conventional thermoforming apparatus 50 (the vacuum forming type well-known in the art), which impresses the container shape.

After thermoforming, the shaped sheet 52 passes through trim press 54, in which the individual bowls 14 for the containers 10 are separated, and the trimmed scrap material is collected for use in the unqualified scrap.

OTHER EMBODIMENTS

Other embodiments of the invention are within the scope of the appended claims. For example only, a few are mentioned.

In the preferred embodiment described above, ELVAC 3190 was used as the adhesive tie layer material because it is known that it binds with polypropylene and polystyrene, the major materials in qualified scrap layers 24 and unqualified scrap layer 22; obviously other tie layers that bind with polypropylene and polystyrene will work. Other materials can be used for the qualified scrap layers and unqualified scrap layers so long as the polyolefin content is above about 10% to provide a moisture barrier, the conditions for acrylic and thermodegradable content are met, and an appropriate tie layer is used for the particular qualified scrap and the particular materials in the unqualified scrap. Suitable tie layer materials can be determined by reference to well-known sources of information on adhesives such as DuPont's Coextrudable Adhesive Resins Chart. Indeed, one of the main advantages of the invention is that scrap materials from different sources and having varying content of different plastics can be coextruded, thus greatly simplifying process controls and reducing the cost of manufacture.

Two additional examples of five-layer sheets follow: In the first example a twenty-seven mil thick sheet is coextruded with four mil thick outer layers 24 of high impact polystyrene (Polysar 520A available from Polysar, Inc.), two one-half mil thick intermediate tie layers 26 of EVA 3190 from DuPont, and an eighteen mil thick central layer 22 of unqualified scrap of the five-layer material described above with 40% polypropylene, 58% impact resistant polystyrene and 2% tie layer material. It has a moisture permeability at 73° F., 90% humidity of about 0.11 gm/100 in$^2$-24 hr. In the second additional example a twenty mil sheet was coextruded with two mil thick outer layers 24 of high impact polystyrene (Polysar 520A), one-half mil thick intermediate tie layers 26 of ELVAC 3190 from DuPont, and a fifteen mil thick central layer 22 of unqualified scrap of trimmings from the preferred embodiment described above. It has a moisture permeability at 78° F., 90% humidity of about 0.08 gm/100 in$^2$-24 hr.

Figure 4:
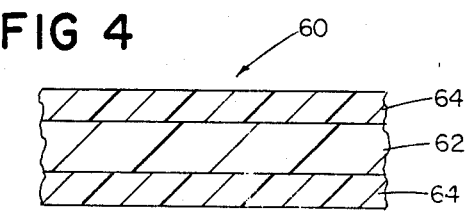
FIG. 4 is a vertical sectional view, taken at 2—2 of FIG. 1, showing the multilayer structure of an alternative embodiment of the invention.

When the predominant plastic in the unqualified scrap is greater than about 70% of the total weight of unqualified scrap, the unqualified scrap can be directly bonded to outer layers of qualified scrap of the predominant plastic, and tie layers can be avoided. For example, FIG. 4 shows three-layer sheet 60 having layer 62 of unqualified scrap with about 70% polystyrene directly bonded to outer layers 64 of qualified scrap polystyrene. In manufacturing sheet 60 with the FIG. 3 apparatus, heated container 32 and conduits 37, 38 are not used.

What is claimed is:

1. A method of making an inexpensive multilayered sheet structure comprising coextruding by separately heating qualified scrap material and unqualified scrap material having sufficient polyolefin content to provide a moisture barrier, supplying said heated material to a coextrusion block to form a multilayer stream with outer layers of said qualified scrap material, and a central layer of said unqualified scrap having sufficient polyolefin content to provide a moisture barrier, and flattening said multilayer stream in a coextrusion die to produce a multilayer sheet.

2. The method of claim 1 wherein said coextruding includes coextruding intermediate tie layers between said central layer and said outer layers of adhesive that binds with the predominant plastic in said unqualified scrap and with said qualified scrap.

3. The method of claim 1 further comprising preparing said unqualified scrap from different sources of material.

4. The method of claim 2 wherein said qualified scrap is impact resistant polystyrene.

5. The method of claim 4 wherein said unqualified scrap includes polypropylene and polystyrene.

6. The method of claim 5 wherein said sheet has a moisture permeability at 78° F., 90% humidity of about 0.02 gm/100 in$^2$-24 hr.

7. The method of claim 1 wherein said unqualified scrap has more than about 10% polypropylene.

8. The method of claim 2, 3, 4, 5 or 6 further comprising thermoforming said sheet into a desired shape.

9. The method of claim 3 further comprising thermoforming said sheet into a desired shape, trimming containers from the thermoformed sheet and using the scrap plastic from trimming in said preparing.

10. The method of claim 3 wherein said inner layer of unqualified scrap has more than about 70% of one type of plastic, said outer layers are made of said one type of plastic, and said coextruding involves coextruding said inner layer directly to said outer layers.

* * * * *